(12) United States Patent
Cho et al.

(10) Patent No.: US 11,335,953 B2
(45) Date of Patent: May 17, 2022

(54) ELECTROLYTE FOR LITHIUM SECONDARY BATTERY AND LITHIUM SECONDARY BATTERY INCLUDING THE SAME

(71) Applicant: SK Innovation Co., Ltd., Seoul (KR)

(72) Inventors: In Haeng Cho, Daejeon (KR); Hyo Shin Kwak, Daejeon (KR); Joo Hyun Lee, Daejeon (KR); Dai In Park, Daejeon (KR)

(73) Assignee: SK Innovation Co., Ltd., Seoul (KR)

( * ) Notice: Subject to any disclaimer, the term of this patent is extended or adjusted under 35 U.S.C. 154(b) by 214 days.

(21) Appl. No.: 16/703,917

(22) Filed: Dec. 5, 2019

(65) Prior Publication Data
US 2020/0185774 A1  Jun. 11, 2020

(30) Foreign Application Priority Data

Dec. 5, 2018 (KR) .................. 10-2018-0155136

(51) Int. Cl.
*H01M 10/0567* (2010.01)
*H01M 10/0569* (2010.01)
*H01M 10/0525* (2010.01)
*H01M 4/505* (2010.01)
*H01M 4/525* (2010.01)
*C07F 9/146* (2006.01)
*H01M 4/02* (2006.01)

(52) U.S. Cl.
CPC ......... *H01M 10/0567* (2013.01); *C07F 9/146* (2013.01); *H01M 4/505* (2013.01); *H01M 4/525* (2013.01); *H01M 10/0525* (2013.01); *H01M 10/0569* (2013.01); *H01M 2004/028* (2013.01)

(58) Field of Classification Search
CPC ......... H01M 10/0525; H01M 10/0567; H01M 10/0569; H01M 10/4235; H01M 2004/028; H01M 2300/0037; H01M 4/505; H01M 4/525
See application file for complete search history.

(56) References Cited

U.S. PATENT DOCUMENTS

2019/0252724 A1* 8/2019 Shatunov .......... H01M 10/0567
2019/0326636 A1* 10/2019 Lee .................. H01M 10/0525

* cited by examiner

*Primary Examiner* — Carlos Barcena
(74) *Attorney, Agent, or Firm* — The Webb Law Firm

(57) ABSTRACT

Provided are an electrolyte for a secondary battery including a lithium salt, a nonaqueous organic solvent, and a difluorophosphite olefin compound, and a lithium secondary battery including the same.

15 Claims, No Drawings

ELECTROLYTE FOR LITHIUM SECONDARY BATTERY AND LITHIUM SECONDARY BATTERY INCLUDING THE SAME

CROSS-REFERENCE TO RELATED APPLICATION

This application claims priority to Korean Patent Application No. 10-2018-0155136 filed Dec. 5, 2018, the disclosure of which is hereby incorporated by reference in its entirety.

TECHNICAL FIELD

The following disclosure relates to an electrolyte for a lithium secondary battery and a lithium secondary battery including the same.

BACKGROUND

Recently, as portable electronic devices have been widely supplied and become smaller, thinner and more lightweight, research on a secondary battery used as a power source thereof, which has a small size, is lightweight, and may be charged and discharged for a long time, has also been actively conducted.

A lithium secondary battery produces electric energy by oxidation and reduction reactions when lithium ions are intercalated into and deintercalated from the cathodes and anodes, and is manufactured by filling an organic electrolyte or a polymer electrolyte between the cathodes and anodes, using a material into and from which lithium ions may be intercalated and deintercalated as the cathodes and anodes.

The organic electrolyte which is currently widely used may include ethylene carbonate, propylene carbonate, dimethoxyethane, gamma-butyrolactone, N,N-dimethylformamide, tetrahydrofuran, acetonitrile, or the like. However, since the organic electrolyte generally easily volatilizes and is highly inflammable, when the organic electrolyte is applied to a lithium ion secondary battery, there were problems in stability at a high temperature, such as ignition due to internal short circuit at the time of internal heat generation by overcharge and overdischarge.

In addition, in the lithium secondary battery, lithium ions from a lithium metal oxide which is a cathode at initial charge move to a carbon electrode which is an anode and are intercalated in carbon, in which lithium has strong reactivity so that a surface of a carbon particle, which is an anode active material, and an electrolyte are reacted, while a coating film which is referred to as a solid electrolyte interface (SEI) film is formed on an anode surface.

Performance of the lithium secondary battery greatly depends on a configuration of the organic electrolyte and the SEI film formed by the reaction of the organic electrolyte and the electrode. That is, the SEI film formed inhibits a side reaction of a carbon material and an electrolyte solvent, for example, decomposition of the electrolyte on the surface of the carbon particle which is the anode, prevents collapse of an anode material due to co-intercalation of the electrolyte solvent into the anode material, and also fulfills the conventional role as a lithium ion tunnel, thereby minimizing battery performance degradation.

However, as charge and discharge of the lithium secondary battery proceed, a cathode active material structurally collapses, so that metal ions are eluted from a cathode surface, and the eluted metal ions are electrodeposited on an anode to deteriorate the anode. This deterioration phenomenon tends to increase the potential of the cathode or be further accelerated when the battery is exposed to a high temperature.

Accordingly, various studies for developing a new organic electrolyte including various additives for stabilizing the SEI film have been attempted.

Meanwhile, as a cathode active material of the lithium secondary battery, a lithium-containing cobalt oxide ($LiCoO_2$) is mainly used, and additionally, a lithium-containing manganese oxide such as $LiMnO_2$ having a layered crystal structure and $LiMn_2O_4$ having a spinel crystal structure, and a lithium-containing nickel oxide ($LiNiO_2$) are also used.

A $LiNiO_2$-based cathode active material shows a rapid phase transition of a crystal structure depending on a volume change accompanied by a charge-discharge cycle, and when the $LiNiO_2$-based cathode active material is exposed to air and moisture, chemical resistance on the surface thereof is rapidly deteriorated, and an excessive amount of gas is produced during storage and cycles, and thus, due to these problems, commercialization thereof is currently limited.

Thus, a lithium transition metal oxide in which nickel is partially substituted by other transition metals such as manganese and cobalt has been suggested. The metal-substituted nickel-based lithium transition metal oxide has an advantage of better cycle characteristics and capacity characteristics, but in this case also, in long-term use, the cycle characteristics are rapidly deteriorated and the problems such as swelling by gassing in the battery and low chemical stability, are not sufficiently solved. In particular, a lithium nickel-based transition metal oxide having a high content of nickel produces an excessive amount of gas during storage or a cycle, so that a serious battery swelling phenomenon is shown and stability at a high temperature is low.

Accordingly, in order to solve the problem of stability at a high temperature while using the lithium nickel-based cathode active material which is appropriate for a higher capacity, a solution to improve a life characteristics and stability at a high temperature of a battery by adding vinylene carbonate, vinyl ethylene carbonate, or the like which is known in the art as an electrolyte additive to form the SEI film has been suggested.

However, when these materials are used for a battery including the nickel-based lithium transition metal oxide as a cathode active material, there was a problem that the swelling phenomenon and deteriorated stability at a high temperature became further serious. That is, though nickel-based lithium transition metal oxide having a high content of nickel has a merit of implementing a high-capacity battery, the nickel cation is eluted from the cathode into the electrolyte and reacts with the SEI film in the anode to decompose the SEI film, causing a part of the anode active material to be exposed to the electrolyte to cause a side reaction, thereby deteriorating stability at a high temperature and life characteristics such as producing a selling phenomenon at a high temperature, and increasing resistance.

Accordingly, a new electrolyte which stabilizes a cathode structure to decrease resistance and improves stability of the SEI film to prevent stability at a high temperature of the lithium secondary battery to be decreased, is required.

SUMMARY

An embodiment of the present invention is directed to providing an electrolyte for a lithium secondary battery which further stabilizes a cathode structure during storage at a high temperature, so that a thickness increase rate is minimized to improve stability at a high temperature, and a lithium secondary battery including the same.

In one general aspect, an electrolyte for a secondary battery includes:
a lithium salt;
a nonaqueous organic solvent; and
a difluorophosphite olefin compound containing at least one difluorophosphite group and at least one olefin group.

In the electrolyte for a lithium secondary battery according to an exemplary embodiment, the difluorophosphite olefin compound may be represented by the following Chemical Formula 1 or 2:

[Chemical Formula 1]

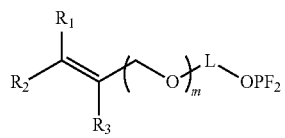

wherein
$R_1$ to $R_3$ are independently of one another hydrogen, *—$(CH_2)_n$—$OPF_2$, C1-C10 alkyl, or C2-C10 alkenyl;
L is C1-C10 alkylene, and the alkylene of L may be further substituted by one or more selected from the group consisting of C1-C10 alkyl, *—$(CH_2)_a$—$OPF_2$ and

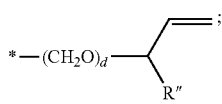

R' is hydrogen or —$OPF_2$;
a and b are independently of each other an integer of 0 to 5;
n is an integer of 0 to 5; and
m is an integer of 0 to 5,

[Chemical Formula 2]

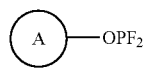

wherein
ring A is C6-C20 cycloalkenyl, C6-C20 bicycloalkenyl, or C6-C20 tricycloalkenyl.

In the electrolyte for a lithium secondary battery according to an exemplary embodiment, in Chemical Formula 1, $R_1$ and $R_2$ may be independently of each other hydrogen, *—$(CH_2)_n$—$OPF_2$, C1-C7 alkyl, or C2-C7 alkenyl, n may be an integer of 1 to 3, and $R_3$ may be hydrogen or —$OPF_2$.

In the electrolyte for a lithium secondary battery according to an exemplary embodiment, the difluorophosphite olefin compound may be preferably represented by the following Chemical Formula 3 or 4:

[Chemical Formula 3]

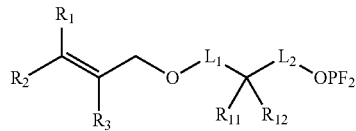

wherein
$R_1$ to $R_3$ are as defined in Chemical Formula 1;
$L_1$ is $C_1$-$C_3$ alkylene;
$L_2$ is a single bond or C1-C3 alkylene;
$R_{11}$ and $R_{12}$ are independently of each other hydrogen, C1-C7 alkyl, *—$(CH_2)_c$—$OPF_2$, or

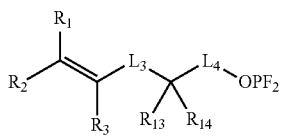

R" is hydrogen or —$OPF_2$; and
c and d are independently of each other an integer of 1 to 3,

[Chemical Formula 4]

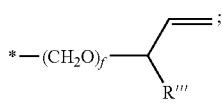

wherein
$R_1$ to $R_3$ are as defined in Chemical Formula 1;
$L_3$ and $L_4$ are independently of each other a single bond or C1-C3 alkylene;
$R_{13}$ and $R_{14}$ are independently of each other hydrogen, C1-C7 alkyl, *—$(CH_2)_e$—$OPF_2$, or

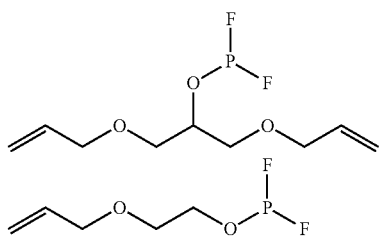

R''' is hydrogen or —$OPF_2$; and
e and f are independently of each other an integer of 0 to 3.

In the electrolyte for a lithium secondary battery according to an exemplary embodiment, in Chemical Formula 3, $R_1$ and $R_2$ may be independently of each other hydrogen or C1-C4 alkyl, and $R_3$ may be hydrogen.

In the electrolyte for a lithium secondary battery according to an exemplary embodiment, in Chemical Formula 4, $R_1$ and $R_2$ may be independently of each other hydrogen, *—$(CH_2)_n$—$OPF_2$, or C2-C4 alkenyl, $R_3$ may be hydrogen or —$OPF_2$, and n may be an integer of 1 to 3.

In the electrolyte for a lithium secondary battery according to an exemplary embodiment, the difluorophosphite olefin compound may be one or more selected from the following structures:

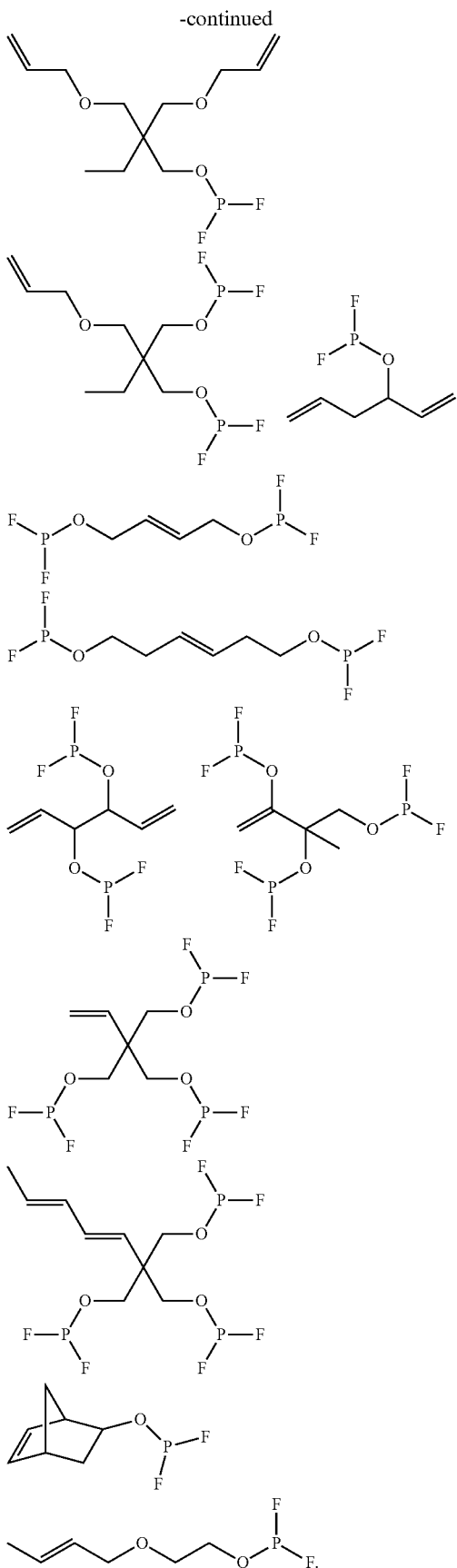

In the electrolyte for a lithium secondary battery according to an exemplary embodiment, the difluorophosphite olefin compound may be included at 0.1 to 5.0 wt %, based on a total weight of the electrolyte.

In the electrolyte for a lithium secondary battery according to an exemplary embodiment, the electrolyte may further include one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds.

In the electrolyte for a lithium secondary battery according to an exemplary embodiment, the sulfinyl group-containing compound may be one or two or more selected from the group consisting of sulfone-based compounds, sulfite-based compounds, sulfonate-based compounds, sultone-based compounds, and sulfate-based compounds.

In the electrolyte for a lithium secondary battery according to an exemplary embodiment, the electrolyte may further include two or more additives selected from the group consisting of fluorine-substituted carbonate-based compounds, vinylidene carbonate-based compounds, sultone-based compounds, and sulfate-based compounds.

In the electrolyte for a lithium secondary battery according to an exemplary embodiment, the electrolyte may further include any one or two or more additives selected from the group consisting of lithium difluoro(oxalato)borate, lithium bis(oxalato)borate, lithium tetrafluoro(oxalato)phosphate, lithium difluoro bis(oxalato)phosphate, fluoroethylene carbonate, difluoroethylene carbonate, fluorodimethyl carbonate, fluoroethyl methyl carbonate, vinylene carbonate, vinyl ethylene carbonate, dimethyl sulfone, diethyl sulfone, ethyl methyl sulfone, methyl vinyl sulfone, divinyl sulfone, ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzene sulfonate, allyl prop-2-ene sulfonate, ethane sultone, 1,3-propane sultone, 1,4-butane sultone, ethene sultone, 1,3-propene sultone, 3-fluoro-1,3-propane sultone, 1,4-butene sultone, ethylene sulfate, propylene sulfate, 2,3-butylene sulfate, 1,3-propylene sulfate, and 1,3-butylene sulfate.

In the electrolyte for a lithium secondary battery according to an exemplary embodiment, the additive may be included at 0.1 to 5.0 wt %, based on the total weight of the electrolyte.

In the electrolyte for a lithium secondary battery according to an exemplary embodiment, the nonaqueous organic solvent may be selected from the group consisting of cyclic carbonate-based solvents, linear carbonate-based solvents, and mixed solvents thereof; the cyclic carbonate may be selected from the group consisting of ethylene carbonate, propylene carbonate, butylene carbonate, vinylene carbonate, vinyl ethylene carbonate, fluoroethylene carbonate and mixtures thereof; and the linear carbonate may be selected from the group consisting of dimethyl carbonate, diethyl carbonate, dipropyl carbonate, ethyl methyl carbonate, methyl propyl carbonate, methyl isopropyl carbonate, ethyl propyl carbonate, and mixtures thereof.

In the electrolyte for a lithium secondary battery according to an exemplary embodiment, the nonaqueous organic solvent may have a mixed volume ratio of the linear carbonate solvent to the cyclic carbonate solvent of 1:1 to 9:1.

In the electrolyte for a lithium secondary battery according to an exemplary embodiment, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$.

In the electrolyte for a lithium secondary battery according to an exemplary embodiment, the lithium salt may be present at a concentration of 0.1 to 2.0 M.

In another general aspect, a lithium secondary battery includes a cathode, an anode, and the electrolyte for a lithium secondary battery of the present invention.

In the lithium secondary battery according to an exemplary embodiment, the cathode may include a composite metal oxide of at least one transition metal selected from the group consisting of cobalt, manganese, and nickel with lithium as a cathode active material, and preferably the cathode active material may be a lithium-nickel-cobalt-manganese-based composite oxide.

In the lithium secondary battery according to an exemplary embodiment, the lithium-nickel-cobalt-manganese-based composite oxide may be $Li_x(Ni_aCo_bMn_c)O_2$ (0.5<x<1.3, 0<a<1, 0<b<1, 0<c<1, a+b+c=1), $Li_x(Ni_aCo_bMn_c)O_4$ (0.5<x<1.3, 0<a<2, 0<b<2, 0<c<2, a+b+c=2), or a mixture thereof.

Other features and aspects will be apparent from the following detailed description, the drawings, and the claims.

DETAILED DESCRIPTION OF EMBODIMENTS

The advantages, features and aspects of the present invention will become apparent from the following description of the embodiments with reference to the accompanying drawings, which is set forth hereinafter. The present invention may, however, be embodied in different forms and should not be construed as limited to the embodiments set forth herein. Rather, these embodiments are provided so that this disclosure will be thorough and complete, and will fully convey the scope of the present invention to those skilled in the art. The terminology used herein is for the purpose of describing particular embodiments only and is not intended to be limiting of example embodiments. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Hereinafter, the present invention will be described in detail. Technical terms and scientific terms used herein have the general meaning understood by those skilled in the art to which the present invention pertains unless otherwise defined, and a description for the known function and configuration which may unnecessarily obscure the gist of the present invention will be omitted in the following description.

"Alkyl" described herein includes both a linear form and a branched form.

"Cycloalkenyl" described herein means a non-aromatic monocyclic or polycyclic hydrocarbon ring monovalent radical containing one or more carbon-carbon double bonds, and examples of the cycloalkenyl group unrestrictedly include cyclohexenyl, norbornenyl, bicyclo[2.2.2]octenyl, and the like, but are not limited thereto.

"Discharge" described herein means a process in which lithium ions are deintercalated from an anode, and "charge" means a process in which lithium ions are intercalated into an anode.

Hereinafter, the electrolyte for a secondary battery and the lithium secondary battery including the same according to an exemplary embodiment of the present invention will be described in detail.

The present invention relates to an electrolyte for a lithium secondary battery for providing a battery having excellent storage characteristics at a high temperature, and the electrolyte for a secondary battery of the present invention includes: a lithium salt; a nonaqueous organic solvent; and a difluorophosphite olefin compound containing at least one difluorophosphite group and at least one olefin group.

Meanwhile, a structural collapse of the cathode active material or a chemical dissolution reaction of the cathode active material by an electrolyte occurs during a repetitive process of charge and discharge, so that transition metal ions may be eluted from the cathode active material, which causes a phenomenon in which performance of the cathode itself is deteriorated or eluted transition metal ions are precipitated on the surface of the anode to be electrodeposited, and in addition, an excessive amount of gas is produced to cause a serious battery swelling phenomenon, resulting in deteriorated performance of the battery.

In order to solve the problems, the electrolyte for a secondary battery of the present invention includes the difluorophosphite olefin compound containing at least one difluorophosphite group and at least one olefin group. The difluorophosphite olefin compound included in the electrolyte for a secondary battery of the present invention has a structure containing both at least one difluorophosphite ($-OPF_2$) and at least one olefin in the molecule, and may further stabilize the structure of the cathode by a coordination bond between the difluorophosphite group and the transition metal of the cathode and also form the SEI film more stably and firmly on the surface of the cathode by oxidative decomposition of the olefin group. The firm SEI film inhibits decomposition of the electrolyte caused by contact of the electrolyte with the cathode active material and the anode active material to inhibit gassing, thereby inhibiting increased internal resistance of the secondary battery.

Therefore, the lithium secondary battery adopting the electrolyte for a secondary battery including the difluorophosphite olefin compound stabilizes the cathode by a coordination bond with the transition metal of the cathode and forms a stable SEI film which is formed on the surface of the cathode to prevent a battery swelling phenomenon caused by gassing during storage at a high temperature, whereby a thickness increase rate at a high temperature is significantly decreased and also a capacity retention rate and a capacity recovery rate are improved, and thus, the battery may have excellent storage characteristics at a high temperature. In addition, due to the firm film, when continuous charge and discharge proceed, thermally very stable characteristics are represented, and thus, characteristics at a high temperature may be much improved.

That is, due to the difluorophosphite olefin compound, the SEI film may be firmly formed on the surface of the cathode or a protective layer may be formed on the surface of the cathode, thereby having improved thermal stability, and the secondary battery adopting the compound may have significantly improved stability at a high temperature.

In the electrolyte for a lithium secondary battery according to an exemplary embodiment, the difluorophosphite olefin compound may be a difluorophosphite olefin compound represented by the following Chemical Formula 1 or 2:

[Chemical Formula 1]

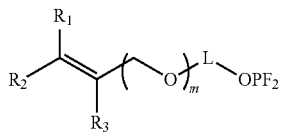

wherein $R_1$ to $R_3$ are independently of one another hydrogen, *—$(CH_2)_n$—$OPF_2$, C1-C10 alkyl, or C2-C10 alkenyl;

L is C1-C10 alkylene, and the alkylene of L may be further substituted by one or more selected from the group consisting of C1-C10 alkyl, *—$(CH_2)_a$—$OPF_2$, and

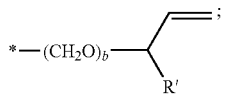

R' is hydrogen or —$OPF_2$;

a and b are independently of each other an integer of 0 to 5;

n is an integer of 0 to 5; and m is an integer of 0 to 5,

[Chemical Formula 2]

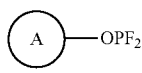

wherein ring A is C6-C20 cycloalkenyl, C6-C20 bicycloalkenyl, or C6-C20 tricycloalkenyl.

In Chemical Formula 1, $R_1$ and $R_2$ may be independently of each other hydrogen, *—$(CH_2)_n$—$OPF_2$, C1-C7 alkyl, or C2-C7 alkenyl, n may be an integer of 1 to 3, and $R_3$ may be hydrogen or —$OPF_2$.

The difluorophosphite olefin compound may contain 1 to 6 difluorophosphite groups and 1 to 6 olefin groups, preferably 1 to 4 difluorophosphite groups and 1 to 4 olefin groups, more preferably 1 to 3 difluorophosphite groups and 1 or 2 olefin groups, and still more preferably 1 or 2 difluorophosphite groups and 1 or 2 olefin groups.

In the electrolyte for a lithium secondary battery according to an exemplary embodiment, the difluorophosphite olefin compound may be a difluorophosphite olefin compound represented by the following Chemical Formula 3 or 4, in terms of chemical stability and electrical properties:

[Chemical Formula 3]

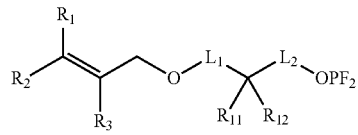

wherein $R_1$ to $R_3$ are as defined Chemical Formula 1;

$L_1$ is $C_1$-$C_3$ alkylene;

$L_2$ is a single bond or C1-C3 alkylene;

$R_{11}$ and $R_{12}$ are independently of each other hydrogen, C1-C7 alkyl, *—$(CH_2)_c$—$OPF_2$, or

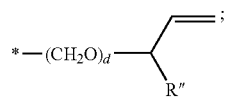

R'' is hydrogen or —$OPF_2$; and c and d are independently of each other an integer of 1 to 3,

[Chemical Formula 4]

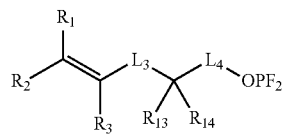

wherein $R_1$ to $R_3$ are as defined Chemical Formula 1;

$L_3$ and $L_4$ are independently of each other a single bond or C1-C3 alkylene;

$R_{13}$ and $R_{14}$ are independently of each other hydrogen, C1-C7 alkyl, *—$(CH_2)_e$—$OPF_2$, or

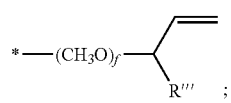

R''' is hydrogen or —$OPF_2$; and e and f are independently of each other an integer of 0 to 3.

In the electrolyte for a lithium secondary battery according to an exemplary embodiment, in Chemical Formula 3, $R_1$ and $R_2$ may be independently of each other hydrogen or C1-C4 alkyl, and $R_3$ may be hydrogen.

In the electrolyte for a lithium secondary battery according to an exemplary embodiment, in Chemical Formula 4, $R_1$ and $R_2$ may be independently of each other hydrogen, *—$(CH_2)_n$—$OPF_2$, or C2-C4 alkenyl, $R_3$ may be hydrogen or —$OPF_2$, and n may be an integer of 1 to 3.

In the electrolyte for a lithium secondary battery according to an exemplary embodiment, more preferably, the difluorophosphite olefin compound may be a difluorophosphite olefin compound represented by the following Chemical Formula 5, in terms of storage characteristics at a high temperature:

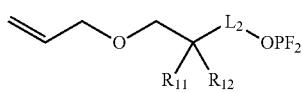

[Chemical Formula 5]

wherein $L_2$ is a single bond or C1-C3 alkylene;

$R_{11}$ is hydrogen or C1-C7 alkyl;

$R_{12}$ is hydrogen, *—$(CH_2)_c$—$OPF_2$, or

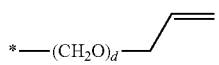

and c and d are independently of each other an integer of 1 to 3.

In the electrolyte for a lithium secondary battery according to an exemplary embodiment, still more preferably, the difluorophosphite olefin compound may be a difluorophosphite olefin compound represented by the following Chemical Formula 6, in terms of storage characteristics at a high temperature:

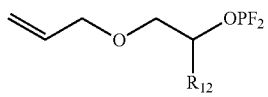

[Chemical Formula 6]

wherein $R_{12}$ is hydrogen, *—$(CH_2)_c$—$OPF_2$, or

and c and d are independently of each other an integer of 1 to 3.

In the electrolyte for a lithium secondary battery according to an exemplary embodiment, the difluorophosphite olefin compound may be still more preferably a difluorophosphite olefin compound represented by the following Chemical Formula 7, in terms of storage characteristics at a high temperature:

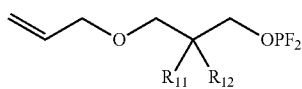

[Chemical Formula 7]

wherein $R_{11}$ is C1-C4 alkyl;

$R_{12}$ is *—$(CH_2)_c$—$OPF_2$, or

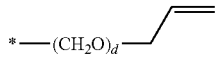

and c and d are independently of each other an integer of 1 to 3.

More specifically, the difluorophosphite olefin compound may be one or more selected from the following structures, but is not limited thereto:

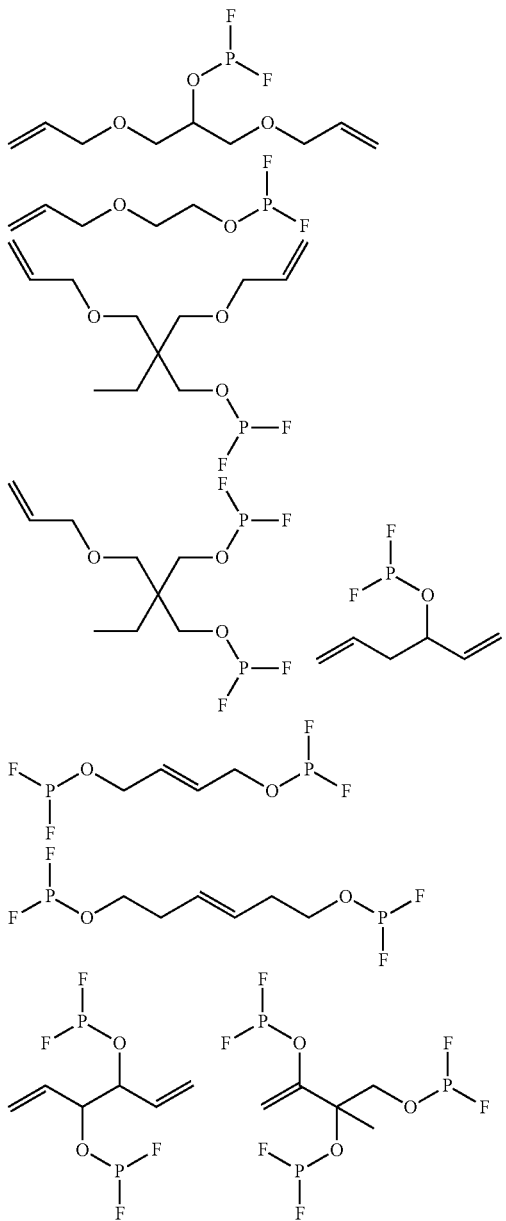

-continued

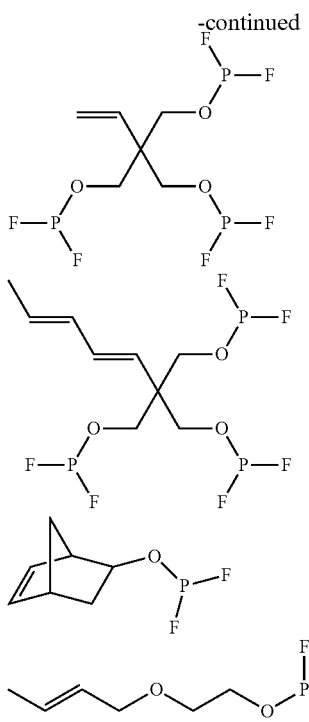

In the electrolyte for a lithium secondary battery according to an exemplary embodiment, the difluorophosphite olefin compound may be included at 0.1 to 5.0 wt %, and preferably 0.5 to 3.0 wt %, in terms of improving stability at a high temperature and a capacity retention rate and preventing deterioration of lithium secondary battery characteristics due to rapid life deterioration occurrence and the like, and may be included more preferably at 1.0 to 3.0 wt %, in terms of stability at a high temperature, based on the total weight of the electrolyte.

In the electrolyte for a lithium secondary battery according to an exemplary embodiment, the electrolyte may further include one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds, in order to improve a battery life or improve durability during storage at a high temperature.

The oxalatoborate-based compound may be a compound represented by the following Chemical Formula A or lithium bis(oxalato)borate (LiB($C_2O_4$)$_2$, LiBOB):

[Chemical Formula A]

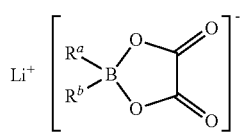

wherein $R^a$ and $R^b$ are independently of each other a halogen or haloC1-C10 alkyl.

Specific examples of the oxalatoborate-based compound may include lithium difluoro(oxalato)borate (LiB($C_2O_4$)$F_2$, LiDFOB), lithium bis(oxalato)borate (LiB($C_2O_4$)$_2$, LiBOB), or the like.

The oxalatophosphate-based compound may be a compound represented by the following Chemical Formula B or lithium difluoro bis(oxalato)phosphate (LiPF$_2$($C_2O_4$)$_2$, LiDFBOP):

[Chemical Formula B]

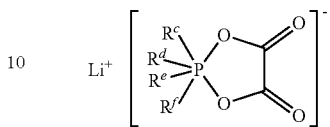

wherein $R^c$ to $R^f$ are independently of one another a halogen or haloC1-C10 alkyl.

Specific examples of the oxalatophosphate-based compound may include lithium tetrafluoro(oxalato)phosphate (LiPF$_4$($C_2O_4$), LiTFOP), lithium difluorobis(oxalato)phosphate (LiPF$_2$($C_2O_4$)$_2$, LiDFBOP), or the like.

The fluorine-substituted carbonate-based compound may be fluoroethylene carbonate (FEC), difluoroethylene carbonate (DFEC), fluorodimethyl carbonate (FDMC), fluoroethyl methyl carbonate (FEMC), or a combination thereof.

The vinylidene carbonate-based compound may be vinylene carbonate (VC), vinyl ethylene carbonate (VEC), or a mixture thereof.

The sulfinyl group (S=O)-containing compound may be a sulfone compound, a sulfite compound, a sulfonate compound, a sultone compound, or a sulfate compound, and these may be used alone or in combination.

The sulfone compound may be specifically a sulfone compound of the following Chemical Formula C:

[Chemical Formula C]

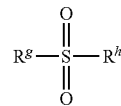

wherein
$R^g$ and $R^h$ are independently of each other hydrogen, a halogen, C1-C10 alkyl, C2-C10 alkenyl, haloC1-C10 alkyl, haloC2-C10 alkenyl, or C6-C12 aryl.

Non-limiting examples of the sulfone compound may include dimethyl sulfone, diethyl sulfone, ethyl methyl sulfone, methyl vinyl sulfone, divinyl sulfone, or the like, but are not limited thereto. In addition, these compounds may be used alone or in combination of two or more.

The sulfite compound may be specifically a sulfite compound of the following Chemical Formula D:

[Chemical Formula D]

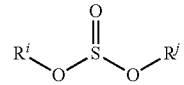

wherein
$R^i$ and $R^j$ are independently of each other hydrogen, a halogen, C1-C10 alkyl, C2-C10 alkenyl, haloC1-C10 alkyl, haloC2-C10 alkenyl, or C6-C12 aryl, or $R^i$ and $R^j$ may be connected via —$CR^{100}R^{101}CR^{102}R^{103}$ ($CR^{104}R^{105}$)$_m$— to form a ring;

$R^{100}$ to $R^{105}$ are independently of one another hydrogen, C1-C10 alkyl, or phenyl; and m is an integer of 0 or 1.

Non-limiting examples of the sulfite compound may include ethylene sulfite, methyl ethylene sulfite, ethyl ethylene sulfite, 4,5-dimethyl ethylene sulfite, 4,5-diethyl ethylene sulfite, propylene sulfite, 4,5-dimethyl propylene sulfite, 4,5-diethyl propylene sulfite, 4,6-dimethyl propylene sulfite, 4,6-diethyl propylene sulfite, 1,3-butylene glycol sulfite, or the like, but are not limited thereto. In addition, these compounds may be used alone or in combination of two or more.

The sulfonate compound may be specifically a sulfonate compound of the following Chemical Formula E:

[Chemical Formula E]

$$R^k - \underset{\underset{O}{\|}}{\overset{\overset{O}{\|}}{S}} - O - R^l$$

wherein $R^k$ and $R^l$ are independently of each other hydrogen, a halogen, C1-C10 alkyl, C2-C10 alkenyl, haloC1-C10 alkyl, haloC2-C10 alkenyl, or C6-C12 aryl.

Non-limiting examples of the sulfonate compound may include methyl methanesulfonate, ethyl methanesulfonate, methyl ethanesulfonate, propyl methanesulfonate, methyl propanesulfonate, ethyl propanesulfonate, vinyl methanesulfonate, allyl methanesulfonate, vinyl benzenesulfonate, allyl prop-2-enesulfonate, or the like, but are not limited thereto. In addition, these compounds may be used alone or in combination of two or more.

The sultone compound may be specifically a sultone compound of the following Chemical Formula F:

[Chemical Formula F]

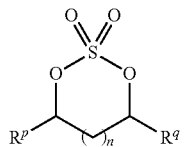

wherein

=-= denotes a single bond or a double bond;

$R^m$ to $R^o$ are independently of one another hydrogen, a halogen, C1-C10 alkyl, C2-C10 alkenyl, haloC1-C10 alkyl, haloC2-C10 alkenyl, or C6-C12 aryl; and n is an integer of 0 to 3.

Non-limiting examples of the sultone compound may include ethane sultone, 1,3-propane sultone (PS), 1,4-butane sultone (BS), ethene sultone, 1,3-propene sultone (PES), 3-fluoro-1,3-propane sultone (FPS), 1,4-butene sultone, or the like, but are not limited thereto. In addition, these compounds may be used alone or in combination of two or more.

The sulfate compound may be specifically a cyclic sulfate compound of the following Chemical Formula G:

[Chemical Formula G]

wherein $R^p$ and $R^q$ are independently of each other hydrogen, a halogen, C1-C10 alkyl, C2-C10 alkenyl, haloC1-C10 alkyl, haloC2-C10 alkenyl, or C6-C12 aryl; and x is an integer of 0 to 3.

Non-limiting examples of the sulfate compound may include ethylene sulfate (ESA), propylene sulfate, 2,3-butylene sulfate, 1,3-propylene sulfate, 1,3-butylene sulfate, or the like, but are not limited thereto. In addition, these compounds may be used alone or in combination of two or more.

In an exemplary embodiment, in terms of stability at a high temperature, more preferably, the electrolyte may further include two or more additives selected from the group consisting of fluorine-substituted carbonate-based compounds, vinylidene carbonate-based compounds, sultone-based compounds, and sulfate-based compounds, and more preferably, the electrolyte may further include two or more additives selected from the group consisting of fluorine-substituted carbonate-based compounds, vinylidene carbonate-based compounds, sultone-based compounds of Chemical Formula F, and cyclic sulfate-based compounds of Chemical Formula G. Still more preferably, the electrolyte may include all of the fluorine-substituted carbonate-based compound, the vinylidene carbonate-based compound, the sultone-based compound of Chemical Formula F, and the cyclic sulfate-based compound of Chemical Formula G as the additive, in terms of more improved characteristics of the lithium secondary battery at a high temperature.

Specifically, the electrolyte may further include two or more additives selected from the group consisting of fluoroethylene carbonate, difluoroethylene carbonate, fluorodimethyl carbonate, fluoroethylmethyl carbonate, vinylene carbonate, vinyl ethylene carbonate, ethanesultone, 1,3-propanesultone, 1,4-butanesultone, ethenesultone, 1,3-propenesultone, 3-fluoro-1,3-propanesultone, 1,4-butenesultone, ethylene sulfate, propylene sulfate, 2,3-butylene sulfate, 1,3-propylene sulfate, and 1,3-butylene sulfate.

More preferably, the electrolyte according to an exemplary embodiment may further include fluoroethylene carbonate, vinylene carbonate, 1,3-propanesultone, 1,3-propenesultone, ethylene sulfate, or a mixture thereof, as an additional additive, and it is more preferred to include a mixture of fluoroethylene carbonate, vinylene carbonate, 1,3-propanesultone, 1,3-propenesultone, and ethylene sulfate, from the viewpoint that the lithium secondary battery has more improved characteristics at a high temperature.

In an exemplary embodiment, the content of the additive is not significantly limited, but in order to improve characteristics at a high temperature such as stability at a high temperature, storage at a high temperature, and a life at a high temperature within the electrolyte for a secondary battery, the additive may be included at 0.1 to 10.0 wt %, and more preferably 0.1 to 5.0 wt %, based on the total weight of the electrolyte.

In the electrolyte for a lithium secondary battery according to an exemplary embodiment, the nonaqueous organic solvent may include carbonate, ester, ether, or ketone alone or in combination, and it is preferred that the nonaqueous organic solvent is selected from the group consisting of cyclic carbonate-based solvents, linear carbonate-based solvents, and mixed solvents thereof, and it is most preferred that a mixture of a cyclic carbonate-based solvent and a linear carbonate-based solvent is used. The cyclic carbonate solvent has a high polarity, so that it may sufficiently dissociate lithium ions, but has a low ion conductivity due to its high viscosity. Therefore, the cyclic carbonate solvent may be mixed with a linear carbonate solvent having low polarity but low viscosity, thereby optimizing the characteristics of the lithium secondary battery.

The cyclic carbonate may be selected from the group consisting of ethylene carbonate, propylene carbonate, butylene carbonate, vinylene carbonate, vinyl ethylene carbonate, fluoroethylene carbonate, and mixtures thereof, and the linear carbonate may be selected from the group consisting of dimethyl carbonate, diethyl carbonate, dipropyl carbonate, ethylmethyl carbonate, methylpropyl carbonate, methylisopropyl carbonate, ethylpropyl carbonate, and mixtures thereof.

In the electrolyte for a lithium secondary battery according to an exemplary embodiment, the nonaqueous organic solvent, which is a mixed solvent of a cyclic carbonate-based solvent and a linear carbonate-based solvent, may be used at a mixed volume ratio between the linear carbonate solvent and the cyclic carbonate solvent of 1:1 to 9:1, and preferably 1.5:1 to 4:1.

In the electrolyte for a lithium secondary battery according to an exemplary embodiment, the lithium salt may be one or two or more selected from the group consisting of $LiPF_6$, $LiBF_4$, $LiClO_4$, $LiSbF_6$, $LiAsF_6$, $LiN(SO_2C_2F_5)_2$, $LiN(CF_3SO_2)_2$, $LiN(SO_3C_2F_5)_2$, $LiN(SO_2F)_2$, $LiCF_3SO_3$, $LiC_4F_9SO_3$, $LiC_6H_5SO_3$, LiSCN, $LiAlO_2$, $LiAlCl_4$, $LiN(C_xF_{2x+1}SO_2)(C_yF_{2y+1}SO_2)$ (wherein x and y are independently of each other a natural number), LiCl, LiI, and $LiB(C_2O_4)_2$, but is not limited thereto.

The concentration of the lithium salt is preferably within a range of 0.1 to 2.0 M, and more preferably within a range of 0.7 to 1.6 M. When the concentration of the lithium salt is less than 0.1 M, the conductivity of the electrolyte is lowered, so that the performance of the electrolyte is deteriorated, and when the concentration of the lithium salt is more than 2.0 M, the viscosity of the electrolyte is increased, so that the mobility of lithium ions is decreased. The lithium salt serves as a source of lithium ions in the battery, thereby allowing operation of a basic lithium secondary battery.

The electrolyte for a lithium secondary battery of the present invention is stable at a temperature in a range of −20° C. to 60° C. and maintains electrochemically stable characteristics even at a voltage of 4.2 V, and thus, may be applied to all types of lithium secondary batteries such as a lithium ion battery and a lithium polymer battery.

In particular, the electrolyte for a lithium secondary battery according to an exemplary embodiment of the present invention may be driven even at a voltage of 4.2 V or higher, based on a cathode potential.

In addition, the present invention provides a lithium secondary battery including the electrolyte for a lithium secondary battery according to an exemplary embodiment of the present invention.

Non-limiting examples of the secondary battery according to an exemplary embodiment include a lithium metal secondary battery, a lithium ion secondary battery, a lithium polymer secondary battery, a lithium ion polymer secondary battery, or the like.

The lithium secondary battery of the present invention includes a cathode, an anode, and the electrolyte for a lithium secondary battery according to an exemplary embodiment.

Specifically, the cathode according to an exemplary embodiment of the present invention includes a cathode active material capable of intercalating and deintercalating lithium ions, and the cathode active material according to an exemplary embodiment of the present invention is a composite metal oxide of at least one transition metal selected from the group consisting of cobalt (Co), manganese (Mn), and nickel (Ni) with lithium, as a preferred combination with the electrolyte for a lithium secondary battery according to an exemplary embodiment of the present invention, and may be one or two or more selected from the group consisting of a lithium-manganese-based composite oxide, a lithium-cobalt-based composite oxide, a lithium-nickel-based composite oxide, a lithium-nickel-manganese-based composite oxide, a lithium-nickel-cobalt-based composite oxide, a lithium-cobalt-manganese-based composite oxide, and a lithium-nickel-cobalt-manganese-based composite oxide.

In the secondary battery including the cathode including a composite metal oxide of at least one transition metal selected from the group consisting of cobalt (Co), manganese (Mn), and nickel (Ni) with lithium as the cathode active material and the electrolyte for a secondary battery according to an exemplary embodiment of the present invention, the difluorophosphite olefin compound included in the electrolyte and the transition metal of the cathode are coordinately bonded, and further stabilize a cathode structure and also form the firm SEI film on the surface of the cathode, thereby inhibiting a side reaction of a cathode surface and the electrolyte during storage at a high temperature to prevent decomposition of the electrolyte, which results in prevention of gassing to effectively inhibit a swelling phenomenon in which a battery swells, and thus, storage stability at a high temperature and durability of the lithium secondary battery may be improved.

Non-limiting examples of the cathode active material may include any one or a mixture of two or more selected from the group consisting of $Li_xCoO_2$ (0.5<x<1.3), $Li_xNiO_2$ (0.5<x<1.3), $Li_xMnO_2$ (0.5<x<1.3), $Li_xMn_2O_4$ (0.5<x<1.3), $Li_x(Ni_aCo_bMn_c)O_2$ (0.5<x<1.3, 0<a<1, 0<b<1, 0<c<1, a+b+c=1), $Li_xNi_{1-y}Co_yO_2$ (0.5<x<1.3, 0<y<1), $Li_xCo_{1-y}Mn_yO_2$ (0.5<x<1.3, 0≤y<1), $Li_xNi_{1-y}Mn_yO_2$ (0.5<x<1.3, 0≤y<1), $Li_x(Ni_aCo_bMn_c)O_4$ (0.5<x<1.3, 0<a<2, 0<b<2, 0<c<2, a+b+c=2), $Li_xMn_{2-z}Ni_zO_4$ (0.5<x<1.3, 0<z<2), $Li_xMn_{2-z}Co_zO_4$ (0.5<x<1.3, 0<z<2), $Li_xCoPO_4$ (0.5<x<1.3), and $Li_xFePO_4$ (0.5<x<1.3).

The cathode active material according to an exemplary embodiment may be a lithium-nickel-cobalt-manganese-based composite oxide as the most preferred combination with the electrolyte for a lithium secondary battery according to an exemplary embodiment of the present invention, preferably $Li_x(Ni_aCo_bMn_c)O_2$ (0.5<x<1.3, 0<a<1, 0<b<1, 0<c<1, a+b+c=1), $Li_x(Ni_aCo_bMn_c)O_4$ (0.5<x<1.3, 0<a<2, 0<b<2, 0<c<2, a+b+c=2), or a mixture thereof, and more preferably $Li_x(Ni_aCo_bMn_c)O_2$, wherein 0.90≤x≤1.10, 0.3≤a≤0.9, 0.05≤b<0.5, 0.05≤c<0.5, and a+b+c=1.

The cathode active material, which is preferably combined with the electrolyte for a lithium secondary battery including the difluorophosphite olefin compound, included in the lithium secondary battery according to an exemplary embodiment, particularly the electrolyte for a lithium secondary battery including two or more additional additives selected from the group consisting of a fluorine-substituted carbonate-based compound, a vinylidene carbonate-based compound, a sultone-based compound, and a sulfate-based compound with the difluorophosphite olefin compound, may be $Li_x(Ni_aCo_bMn_c)O_2$, wherein $0.90 \leq x \leq 1.10$, $0.3 \leq a \leq 0.9$, $0.05 \leq b < 0.5$, $0.05 \leq c < 0.5$, and $a+b+c=1$, and more preferably $Li(Ni_aCo_bMn_c)O_2$, wherein $0.3 \leq a \leq 0.9$, $0.05 \leq b < 0.5$, $0.05 \leq c < 0.5$, and $a+b+c=1$.

Preferably, the cathode active material according to an exemplary embodiment may be $LiNi_{0.6}Co_{0.2}Mn_{0.2}O_2$, $LiNi_{0.5}Co_{0.2}Mn_{0.3}O_2$, $LiNi_{0.8}Co_{0.1}Mn_{0.1}O_2$, $LiNi_{1/3}Co_{1/3}Mn_{1/3}O_2$, or a mixture thereof, and more preferably, may be $LiNi_{0.8}Co_{0.1}Mn_{0.1}O_2$, $LiNi_{0.5}Co_{0.2}Mn_{0.3}O_2$, or a mixture thereof.

The anode includes an anode current collector and an anode active material layer formed on the anode current collector, the anode active material layer includes an anode active material capable of intercalating and deintercalating lithium ions, and as the anode active material, carbon materials such as crystalline carbon, amorphous carbon, a carbon composite, and carbon fiber, a lithium metal, an alloy of lithium and another element, and the like may be used. Non-limited examples of the amorphous carbon includes soft carbon (low temperature baked carbon), hard carbon, coke, mesocarbon microbeads (MCMB) baked at 1500° C. or lower, mesophase pitch-based carbon fiber (MPCF), or the like. Non-limiting examples of the crystalline carbon includes graphite-based materials, and specifically natural graphite, graphitized coke, graphitized MCMB, graphitized MPCF, or the like. The carbon materials are preferably a material having a d002 interplanar distance of 3.35 to 3.38 Å, and Lc (crystallite size) by X-ray diffraction of at least 20 nm or more. As other elements forming an alloy with lithium, aluminum, zinc, bismuth, cadmium, antimony, silicon, lead, tin, gallium, or indium may be used.

The cathode or the anode may be prepared by dispersing an electrode active material, a binder, a conductive material, and if necessary, a thickener in a solvent to prepare an electrode slurry composition, and applying the slurry composition on an electrode current collector. As a cathode current collector, aluminum, an aluminum alloy, or the like may be often used, and as an anode current collector, copper, a copper alloy, or the like may be often used. The cathode current collector and the anode current collector may be in the form of foil or mesh.

The binder is a material serving as formation of a paste of the active material, mutual adhesion of the active material, adhesion with the current collector, a buffer effect to expansion and shrinkage of the active material, and the like, and includes for example, polyvinylidene fluoride (PVdF), a copolymer of polyhexafluoropropylene-polyvinylidene fluoride (PVdF/HFP), poly(vinyl acetate), polyvinyl alcohol, polyethylene oxide, polyvinyl pyrrolidone, alkylated polyethylene oxide, polyvinyl ether, poly(methyl methacrylate), poly(ethyl acrylate), polytetrafluoroethylene, polyvinyl chloride, polyacrylonitrile, polyvinyl pyridine, a styrene butadiene rubber, an acrylonitrile-butadiene rubber, and the like. The content of the binder is not significantly limited, but may be 0.1 to 30 wt %, preferably 1 to 10 wt %, relative to the electrode active material. When the content of the binder is too low, the adhesive strength between the electrode active material and the current collector will be insufficient, and when the content of the binder is too high, the adhesive strength will be better, but the content of the electrode active material will be reduced by the increased amount of the binder, and thus, it is disadvantageous for an increased battery capacity.

The conductive material which is used for imparting conductivity to an electrode, may be any material as long as it does not cause any chemical change and is an electron conductive material in a composed battery, and at least one selected from the group consisting of a graphite-based conductive material, a carbon black-based conductive material, a metal, or a metal compound-based conductive material may be used as the conductive material. Examples of the graphite-based conductive material include artificial graphite, natural graphite, or the like, examples of the carbon black-based conductive material include acetylene black, ketjen black, denka black, thermal black, channel black, or the like, and examples of the metal-based or metal compound-based conductive material include a tin, tin oxide, tin phosphate ($SnPO_4$), titanium oxide, potassium titanate, perovskite materials such as $LaSrCoO_3$ or $LaSrMnO_3$. However, the conductive material is not limited thereto.

The content of the conductive material is not significantly limited, but may be 0.1 to 10 wt %, relative to the electrode active material. When the content of the conductive material is less than 0.1 wt %, electrochemical properties are deteriorated, and when the content is more than 10 wt %, energy density per weight may be reduced.

The thickener is not particularly limited as long as it may serve to control the viscosity of an active material slurry, and for example, carboxymethyl cellulose, hydroxylmethyl cellulose, hydroxyethyl cellulose, hydroxypropyl cellulose, or the like may be used.

As the solvent in which the electrode active material, the binder, the conductive material, and the like are dispersed, a nonaqueous solvent or an aqueous solvent is used. The nonaqueous solvent may include N-methyl-2-pyrrolidone (NMP), dimethyl formamide, dimethyl acetamide, N,N-dimethylaminopropylamine, ethylene oxide, tetrahydrofuran, and the like.

The lithium secondary battery according to an exemplary embodiment may include a separator which prevents a short circuit between the cathode and the anode and provides an ion channel of lithium ions, and as the separator, a polyolefin-based polymer film such as polypropylene, polyethylene, polyethylene/polypropylene, polyethylene/polypropylene/polyethylene, and polypropylene/polyethylene/polypropylene, or a multiple film, a microporous film, and woven and non-woven fabric thereof may be used. Further, a film in which a resin having excellent stability is coated on a porous polyolefin film may be used.

The lithium secondary battery of the present invention may be formed in other shapes such as cylindrical and pouch, in addition to a square shape. The secondary battery is also appropriate for uses requiring high voltage, high power, and high temperature drive, such as an electric vehicle, in addition to the conventional uses as a mobile phone, a portable computer, or the like. In addition, the secondary battery may be combined with conventional internal combustion engines, fuel cells, supercapacitors, and the like and used for a hybrid vehicle and the like also, and may be used for electric bicycles, machine tools, and other any uses requiring high power, high voltage, and high temperature drive.

Hereinafter, the Examples and Comparative Examples of the present invention will be described. However, the following Examples are only a preferred exemplary embodiment, and the present invention is not limited thereto. Assuming that a lithium salt is all dissociated so that a lithium ion concentration becomes 1.0 M, a basic electrolyte may be formed by dissolving a corresponding amount of a lithium salt such as $LiPF_6$ in a basic solvent to a concentration of 1.0 M.

[Example 1] Preparation of (1,3-bis(allyloxy)propan-2-yl)difluorophosphite (Compound 1)

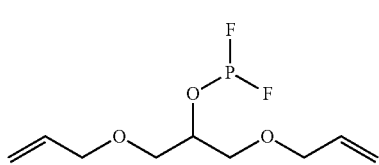

(1)

Step 1: Preparation of (1,3-bis(allyloxy)propan-2-yl)dichlorophosphite ($C_9H_{15}Cl_2O_3P$)

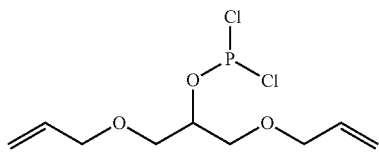

150 ml of acetonitrile was added to a 500 ml flask under a nitrogen atmosphere, 37.78 g (275.5 mmol) of trichlorophosphine ($PCl_3$) was added thereto, and the temperature was lowered to −15° C. using brine and dry ice. A mixed solution of 43.56 g (252.9 mmol) of 1,3-bis(allyloxy)propan-2-ol and 20 ml of acetonitrile was slowly added dropwise thereto for 1 hour, and the solution was stirred for 3 hours while the temperature was raised to room temperature. The reaction mixture was depressurized to a vacuum to remove the solvent, thereby obtaining 58.85 g (215.5 mmol) of (1,3-bis(allyloxy)propan-2-yl)dichlorophosphite ($C_9H_{15}Cl_2O_3P$) as a final product with a yield of 85.2%.

$^1$H NMR (500 MHz, $C_6D_6$) δ 5.70 (m, 2H), 5.13 (d, 2H), 4.99 (d, 2H), 4.77 (m, 1H), 3.68 (m, 4H), 3.45 (m, 4H) ppm Step 2: Preparation of (1,3-bis(allyloxy)propan-2-yl)difluorophosphite ($C_9H_{15}F_2O_3P$) (Compound 1)

17.00 g (95.4 mmol) of antimony trifluoride was added to a 100 ml flask under a nitrogen atmosphere. In order to prevent heat generation, a damaged synthetic product, and a lowered yield of the final product by a rapid reaction, the temperature was lowered to 0° C. 38.76 g (141.9 mmol) of (1,3-bis(allyloxy)propan-2-yl)dichlorophosphite obtained in step 1 was slowly added dropwise for 1 hour, and then the solution was further stirred for 2 hours while the temperature was raised to room temperature. Distillation under reduced pressure was performed for purification to obtain 23.6 g (98.3 mmol) of (1,3-bis(allyloxy)propan-2-yl)difluorophosphite ($C_9H_{15}F_2O_3P$) as a final product with a yield of 69.2%.

$^1$H NMR (500 MHz, $C_6D_6$) δ 5.69 (m, 2H), 5.13 (d, 2H), 4.99 (d, 2H), 4.51 (m, 1H), 3.67 (m, 4H), 3.28 (m, 4H) ppm

[Example 2] Preparation of (2-(allyloxy)ethan-1-yl)difluorophosphite ($C_5H_9F_2O_2P$) (Compound 2)

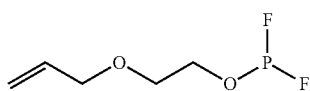

(2)

Step 1: Preparation of (2-(allyloxy)ethan-1-yl)dichlorophosphite ($C_5H_9Cl_2O_2P$)

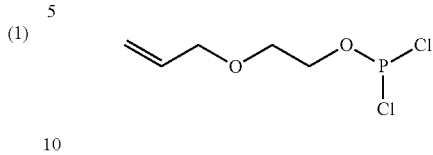

30 ml of acetonitrile was added to a 250 ml flask under a nitrogen atmosphere, 15.74 g (114.8 mmol) of trichlorophosphine ($PCl_3$) was added thereto, and the temperature was lowered to −15° C. using brine and dry ice. A mixed solution of 11.06 g (108.3 mmol) of 2-(allyloxy)ethan-1-ol and 30 ml of acetonitrile was slowly added dropwise thereto for 1 hour, and the solution was stirred for 3 hours while the temperature was raised to room temperature. The reaction mixture was depressurized to a vacuum to remove the solvent, thereby obtaining 19.67 g (96.9 mmol) of (2-(allyloxy)ethan-1-yl)dichlorophosphite ($C_5H_9Cl_2O_2P$) as a final product with a yield of 89.5%.

$^1$H NMR (500 MHz, $C_6D_6$) δ 5.70 (m, 1H), 5.14 (d, 1H), 4.99 (d, 1H), 3.95 (m, 2H), 3.63 (m, 2H), 3.04 (m, 2H) ppm Step 2: Preparation of (2-(allyloxy)ethan-1-yl)difluorophosphite ($C_5H_9F_2O_2P$) (Compound 2)

11.61 g (65.2 mmol) of antimony trifluoride was added to a 100 ml flask under a nitrogen atmosphere. In order to prevent heat generation, a damaged synthetic product, and a lowered yield of the final product by a rapid reaction, the temperature was lowered to 0° C. 19.67 g (96.9 mmol) of (2-(allyloxy)ethan-1-yl)dichlorophosphite obtained in step 1 was slowly added dropwise for 1 hour, and then the solution was further stirred for 2 hours while the temperature was raised to room temperature. Distillation under reduced pressure was performed for purification to obtain 4.10 g (24.1 mmol) of (2-(allyloxy)ethan-1-yl)difluorophosphite ($C_5H_9F_2O_2P$) as a final product with a yield of 24.9%.

$^1$H NMR (500 MHz, $C_6D_6$) δ 5.69 (m, 1H), 5.13 (d, 1H), 4.98 (d, 1H), 3.71 (m, 2H), 3.63 (m, 2H), 3.04 (m, 2H) ppm

[Example 3] Preparation of (2,2-bis((allyloxy)methyl)butan-1-yl)difluorophosphite ($C_{12}H_{21}F_2O_3P$) (Compound 3)

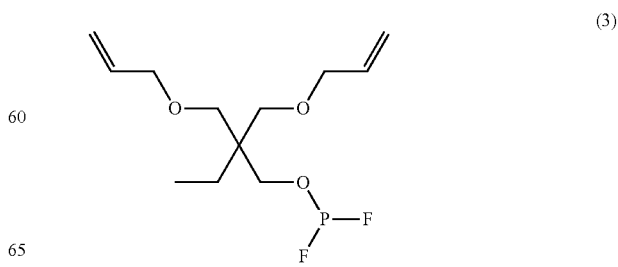

(3)

Step 1: Preparation of (2,2-bis((allyloxy)methyl)butan-1-yl)dichlorophosphite ($C_{12}H_{21}Cl_2O_3P$)

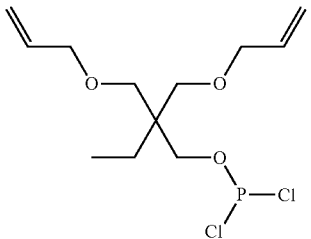 [SMILES: C=CCOCC(CC)(COCC=C)COP(Cl)Cl]

10 ml of acetonitrile was added to a 100 ml flask under a nitrogen atmosphere, 3.36 g (24.5 mmol) of trichlorophosphine ($PCl_3$) was added thereto, and the temperature was lowered to −15° C. using brine and dry ice. A mixed solution of 5.00 g (23.3 mmol) of 2,2-bis((allyloxy)methyl)butan-1-ol and 10 ml of acetonitrile was slowly added dropwise thereto for 1 hour, and the solution was stirred for 3 hours while the temperature was raised to room temperature. The reaction mixture was depressurized to a vacuum to remove the solvent, thereby obtaining 6.47 g (20.5 mmol) of (2,2-bis((allyloxy)methyl)butan-1-yl)dichlorophosphite ($C_{12}H_{21}Cl_2O_3P$) as a final product with a yield of 88.0%.

$^1$H NMR (500 MHz, $C_6D_6$) δ 5.75 (m, 2H), 5.15 (d, 2H), 5.01 (d, 2H), 4.25 (d, 2H), 3.70 (s, 4H), 3.15 (s, 4H), 1.43 (q, 2H), 0.81 (t, 3H) ppm Step 2: Preparation of (2,2-bis((allyloxy)methyl)butan-1-yl)difluorophosphite ($C_{12}H_{21}F_2O_3P$) (Compound 3)

2.46 g (13.8 mmol) of antimony trifluoride was added to a 25 ml flask under a nitrogen atmosphere. In order to prevent heat generation, a damaged synthetic product, and a lowered yield of the final product by a rapid reaction, the temperature was lowered to 0° C. 6.47 g (20.5 mmol) of (2,2-bis((allyloxy)methyl)butan-1-yl)dichlorophosphite obtained in step 1 was slowly added dropwise for 1 hour, and then the solution was further stirred for 2 hours while the temperature was raised to room temperature. Distillation under reduced pressure was performed for purification to obtain 2.90 g (10.3 mmol) of (2,2-bis((allyloxy)methyl)butan-1-yl)difluorophosphite ($C_{12}H_{21}F_2O_3P$) as a final product with a yield of 50.1%.

$^1$H NMR (500 MHz, $C_6D_6$) δ 5.74 (m, 2H), 5.12 (d, 2H), 4.99 (d, 2H), 4.02 (d, 2H), 3.77 (s, 4H), 3.11 (s, 4H), 1.44 (q, 2H), 0.77 (t, 3H) ppm

[Example 4] Preparation of ((2-((allyloxy)methyl)-2-ethylpropan-1,3-diyl)bis)(difluorophosphite) ($C_9H_{16}F_4O_3P_2$) (Compound 4)

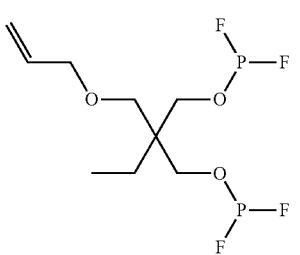

(4)

Step 1: Preparation of ((2-((allyloxy)methyl)-2-ethylpropan-1,3-diyl)bis)(dichlorophosphite) ($C_9H_{16}Cl_4O_3P_2$)

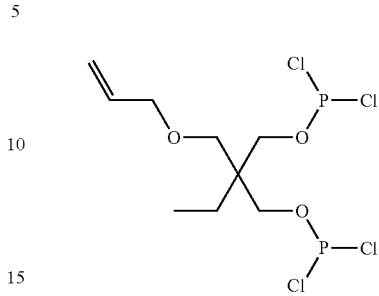

10 ml of heptane was added to a 100 ml flask under a nitrogen atmosphere, 31.52 g (229.5 mmol) of trichlorophosphine ($PCl_3$) was added thereto, and the temperature was lowered to −78° C. using acetone and dry ice. 10.00 g (57.4 mmol) of 2-((allyloxy)methyl)-2-ethylpropan-1,3-diol was slowly added dropwise thereto for 30 minutes, and the solution was stirred for 3 hours while the temperature was raised to room temperature. The reaction mixture was depressurized to a vacuum to remove the solvent, thereby obtaining 14.38 g (38.2 mmol) of ((2-((allyloxy)methyl)-2-ethylpropan-1,3-diyl)bis)(dichlorophosphite) ($C_9H_{16}Cl_4O_3P_2$) as a final product with a yield of 66.6%.

$^1$H NMR (500 MHz, $C_6D_6$) δ 5.70 (m, 1H), 5.11 (d, 1H), 4.99 (d, 1H), 4.10 (d, 2H), 3.67 (d, 2H), 3.61 (t, 2H), 3.29 (s, 2H), 0.81 (m, 2H), 0.41 (t, 3H) ppm Step 2: Preparation of ((2-((allyloxy)methyl)-2-ethylpropan-1,3-diyl)bis)(difluorophosphite) ($C_9H_{16}F_4O_3P_2$) (Compound 4)

9.09 g (50.9 mmol) of antimony trifluoride was added to a 50 ml flask under a nitrogen atmosphere. In order to prevent heat generation, a damaged synthetic product, and a lowered yield of the final product by a rapid reaction, the temperature was lowered to 0° C. 14.38 g (38.2 mmol) of ((2-((allyloxy)methyl)-2-ethylpropan-1,3-diyl)bis)(dichlorophosphite) obtained in step 1 was slowly added dropwise for 1 hour, and then the solution was further stirred for 2 hours while the temperature was raised to room temperature. Distillation under reduced pressure was performed for purification, thereby obtaining 5.58 g (18.0 mmol) of ((2-((allyloxy)methyl)-2-ethylpropan-1,3-diyl)bis)(difluorophosphite) $C_9H_{16}F_4O_3P_2$ as a final product with a yield of 47.1%.

$^1$H NMR (500 MHz, $C_6D_6$) δ 5.73 (m, 1H), 5.12 (d, 1H), 4.99 (d, 1H), 3.85 (d, 2H), 3.72 (d, 2H), 3.52 (t, 2H), 3.44 (s, 2H), 0.81 (m, 2H), 0.42 (t, 3H) ppm

[Examples 5 to 9, and Comparative Examples 1 to 3] Manufacture of Lithium Secondary Battery Electrolytes were prepared by further adding the components described in following Table 1 to a basic electrolyte (1.0 M $LiPF_6$, EC/EMC=25/75) which is a solution in which $LiPF_6$ is dissolved in a mixed solvent of ethylene carbonate (EC) and ethylmethyl carbonate (EMC) at a volume ratio of 25:75 so that the solution becomes a 1.0 M solution.

A battery to which the nonaqueous electrolyte was applied was manufactured as follows:

LiNi$_{0.8}$Co$_{0.1}$Mn$_{0.1}$O$_2$ and LiNi$_{0.5}$Co$_{0.2}$Mn$_{0.3}$O$_2$ were mixed at a weight ratio of 6:4 and used as a cathode active material, polyvinylidene fluoride (PVdF) was used as a binder, and carbon was used as a conductive material. The cathode active material, the binder, and the conductive material were mixed at a weight ratio of 92:4:4, and dispersed in N-methyl-2-pyrrolidone to prepare a cathode slurry. This slurry was coated on an aluminum foil having a thickness of 20 μm, which was dried and rolled to prepare a cathode.

Artificial graphite and natural graphite as an anode active material were mixed at a weight ratio of 7:3 and used, a styrene-butadiene rubber (SBR) was used as a binder, and carboxymethyl cellulose (CMC) was used as a thickener. The anode active material, the binder, and the thickener were mixed at a weight ratio of 96:2:2, and dispersed in water to prepare an anode slurry. This slurry was coated on a copper foil having a thickness of 15 μm, which was dried and rolled to prepare an anode.

A film separator made of polyethylene (PE) having a thickness of 25 μm was stacked between the thus-prepared electrodes to form a cell using a pouch having a size of thickness of 8 mm×width of 60 mm×length of 90 mm, and the nonaqueous electrolyte was injected to manufacture a 1.7 Ah grade lithium secondary battery.

Performance of the thus-manufactured 1.7 Ah grade battery was evaluated as follows, and the results are shown in Table 2. Evaluation items were the following:

*Evaluation Items*

1. Thickness increase rate after 6 weeks at 60° C.: when the thickness of the battery after being charged at 4.2V with 1 C CC-CV at room temperature for 3 hours was set as 'A', and the thickness of the battery after being allowed to stand under a exposed normal pressure for 6 weeks in the atmosphere at 60° C. using a closed thermostat was set as 'B', the thickness increase rate was calculated by the following Equation 1. A cell thickness was measured using a flat plate thickness measuring apparatus (manufactured by Misutoyo Corporation, 543-490B).

Thickness increase rate (%)=($B$-$A$)/$A$×100    [Equation 1]

2. DCIR increase rate after 6 weeks at 60° C.: C-rates were sequentially varied to 0.2 C, 0.5 C, 1.0 C, 1.5 C, 2.0 C, 2.5 C, 3.0 C, at a point of SOC 60%, and when charge and discharge to the corresponding C-rate were performed for 10 seconds, a termination point of voltage was configured to a straight line equation, and the slope thereof was adopted as DCIR. When DCIR of the battery before starting storage at a high temperature was "C", and DCIR of the battery after being allowed to stand at a high temperature of 60° C. for 6 weeks was "D", the increase rate of DCIR was calculated by the following Equation 2:

Increase rate of DCIR (%)=($D$-$C$)/$C$×100    [Equation 2]

3. Capacity retention ratio after 6 weeks at 60° C.: a battery was allowed to stand at 60° C. for 6 weeks and then at room temperature for 30 minutes, and calculation was performed by dividing a capacity obtained from 1 C rate CC discharge (2.7 V cut-off) after IR measurement by a capacity measured before storage and the result was shown in a percentage.

Capacity retention ratio of battery (%)=(final capacity/initial capacity)×100(%)

4. Capacity recovery rate after 6 weeks at 60° C. (storage efficiency at high temperature): a battery was allowed to stand at 60° C. for 6 weeks and then discharged with a current of 1 C with CC to 2.7 V, and then a usable capacity (%) relative to an initial capacity was measured.

TABLE 1

| | Electrolyte composition (total 100 wt %) |
|---|---|
| Example 5 | Basic electrolyte + 1.0 wt % of Compound (1) |
| Example 6 | Basic electrolyte + 2.0 wt % of Compound (1) |
| Example 7 | Basic electrolyte + 1.0 wt % of Compound (2) |
| Example 8 | Basic electrolyte + 1.0 wt % of Compound (3) |
| Example 9 | Basic electrolyte + 1.0 wt % of Compound (4) |
| Comparative Example 1 | Basic electrolyte |
| Comparative Example 2 | Basic electrolyte + 1.0 wt % of Comparative Compound A |
| Comparative Example 3 | Basic electrolyte + 1.0 wt % of Comparative Compound B |

Basic electrolyte: 1.0M LiPF$_6$, EC/EMC = 25/75

Compound (1):

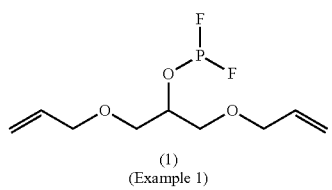

(1)
(Example 1)

Compound (2):

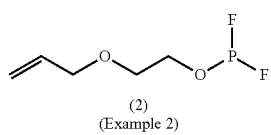

(2)
(Example 2)

Compound (3):

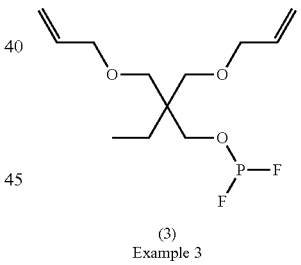

(3)
Example 3

Compound (4):

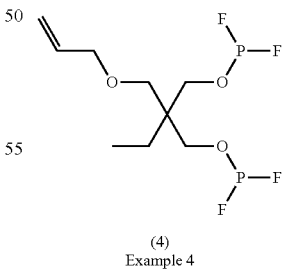

(4)
Example 4

Comparative Compound A:

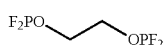

Comparative Compound B:

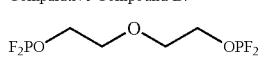

TABLE 2

| Lithium secondary battery | Initial thickness [mm] | Thickness after 6 weeks at 60° C. [mm] | After 6 weeks at 60° C. | | | |
|---|---|---|---|---|---|---|
| | | | Thickness increase rate [%] | DCIR increase rate [%] | Capacity retention rate [%] | Capacity recovery rate [%] |
| Example 5 | 5.77 | 8.70 | 51 | 77 | 62 | 64 |
| Example 6 | 5.80 | 8.50 | 47 | 88 | 64 | 65 |
| Example 7 | 5.72 | 8.53 | 49 | 77 | 59 | 62 |
| Example 8 | 5.74 | 8.84 | 54 | 90 | 63 | 64 |
| Example 9 | 5.79 | 8.62 | 49 | 82 | 60 | 61 |
| Comparative Example 1 | 5.69 | 10.70 | 88 | 153 | 54 | 56 |
| Comparative Example 2 | 5.74 | 9.23 | 61 | 98 | 60 | 60 |
| Comparative Example 3 | 5.79 | 9.07 | 57 | 100 | 59 | 61 |

From the above Table 2, it is recognized that the lithium secondary battery adopting the electrolyte including the difluorophosphite olefin compound which is a specific additive had a low DCIR increase rate as well as a low thickness increase rate even after being allowed to stand at 60° C. for 6 weeks, and thus, had a very high stability at a high temperature.

However, it is recognized that the lithium secondary batteries of Comparative Examples 1 to 3 adopting an electrolyte including no difluorophosphite olefin compound which is the specific additive of the present invention had a high thickness increase rate and a high DCIR increase rate after being allowed to stand at 60° C. for 6 weeks, and thus, had significantly deteriorated stability at high temperature.

From the above results, it is recognized that when the lithium secondary battery adopting the electrolyte including the difluorophosphite olefin compound which is the specific additive of the present invention is allowed stand at a high temperature for a long time, the battery had a low thickness increase rate and also had a DCIR increase rate lower than those of the comparative examples using other additives, thereby having excellent characteristics at a high temperature.

[Examples 10 to 13, and Comparative Examples 4 and 5] Manufacture of Lithium Secondary Battery Electrolytes were prepared by further adding the components described in following Table 3 to a basic electrolyte (1.0 M LiPF$_6$, EC/EMC=25/75) which is a solution in which LiPF$_6$ is dissolved in a mixed solvent of ethylene carbonate (EC) and ethylmethyl carbonate (EMC) at a volume ratio of 25:75 so that the solution becomes a 1.0 M solution. The nonaqueous electrolyte prepared above was used to manufacture a 1.7 Ah grade battery in the same manner as in Example 5, the battery performance was evaluated, and the results are shown in the following Table 4.

TABLE 3

| | Electrolyte composition (total 100 wt %) |
|---|---|
| Example 10 | Basic electrolyte + 1.0 wt % of Compound (1) + 0.5 wt % of VC + 1.0 wt % of FEC + 0.3 wt % of PRS + 0.5 wt % of PS + 0.5 wt % of ESA |
| Example 11 | Basic electrolyte + 1.0 wt % of Compound (2) + 0.5 wt % of VC + 1.0 wt % of FEC + 0.3 wt % of PRS + 0.5 wt % of PS + 0.5 wt % of ESA |
| Example 12 | Basic electrolyte + 1.0 wt % of Compound (3) + 0.5 wt % of VC + 1.0 wt % of FEC + 0.3 wt % of PRS + 0.5 wt % of PS + 0.5 wt % of ESA |
| Example 13 | Basic electrolyte + 1.0 wt % of Compound (4) + 0.5 wt % of VC + 1.0 wt % of FEC + 0.3 wt % of PRS + 0.5 wt % of PS + 0.5 wt % of ESA |
| Comparative Example 4 | Basic electrolyte + 0.5 wt % of VC + 1.0 wt % of FEC + 0.3 wt % of PRS + 0.5 wt % of PS + 0.5 wt % of ESA |
| Comparative Example 5 | Basic electrolyte + 1.0 wt % of Comparative Compound A + 0.5 wt % of VC + 1.0 wt % of FEC + 0.3 wt % of PRS + 0.5 wt % of PS + 0.5 wt % of ESA |

Basic electrolyte: 1.0M LiPF$_6$, EC/EMC = 25/75

Compound (1):

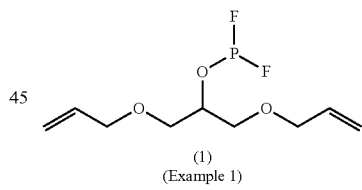

(1)
(Example 1)

Compound (2):

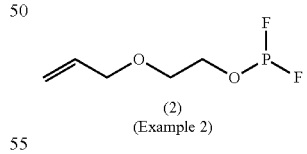

(2)
(Example 2)

Compound (3):

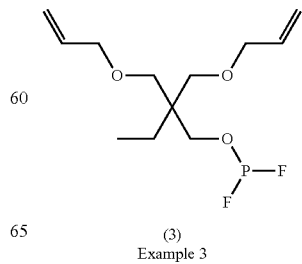

(3)
Example 3

TABLE 3-continued

Electrolyte composition (total 100 wt %)

Compound (4):

(4)
Example 4

Comparative Compound A:

$F_2PO\diagdown\diagup OPF_2$

VC: vinylene carbonate
FEC: fluoroethylene carbonate
PRS: 1,3-propene sultone
PS: 1,3-propane sultone
ESA: ethylene sulfate

TABLE 4

| Lithium secondary battery | Initial thickness [mm] | Thickness after 6 weeks at 60° C. [mm] | After 6 weeks at 60° C. | | | |
|---|---|---|---|---|---|---|
| | | | Thickness increase rate [%] | DCIR increase rate [%] | Capacity retention rate [%] | Capacity recovery rate [%] |
| Example 10 | 5.97 | 7.08 | 19 | 14 | 87 | 90 |
| Example 11 | 5.91 | 6.88 | 16 | 13 | 84 | 86 |
| Example 12 | 5.94 | 7.26 | 22 | 24 | 87 | 90 |
| Example 13 | 5.99 | 7.19 | 20 | 19 | 85 | 87 |
| Comparative Example 4 | 5.77 | 8.48 | 47 | 66 | 70 | 71 |
| Comparative Example 5 | 5.84 | 7.77 | 33 | 34 | 76 | 78 |

From the above Table 4, it is recognized that the electrolyte for a secondary battery including the difluorophosphite olefin compound which is the specific additive of the present invention further includes two or more additives selected from the group consisting of fluorine-substituted carbonate-based compounds, vinylidene carbonate-based compounds, sultone-based compounds, and sulfate-based compounds, as an additional additive, thereby having more improved storage stability at a high temperature. That is, it is recognized that the lithium secondary battery of Examples 10 to 13 adopting the electrolyte for a secondary battery including the difluorophosphite olefin compound which is the specific additive of the present invention and two or more further additives selected from the group consisting of fluorine-substituted carbonate-based compounds, vinylidene carbonate-based compounds, sultone-based compounds, and sulfate-based compounds had very low thickness increase rate and DCIR increase rate even after being allowed to stand at 60° C. for 6 weeks, and also had very high capacity retention rate and capacity recovery rate, and thus, had excellent stability at a high temperature.

In particular, it is recognized that the lithium secondary battery adopting the electrolyte including both the difluorophosphite olefin compound which is the specific additive of the present invention and the further additive, VC, FEC, PRS, PS, and ESA has more improved stability at a high temperature.

That is, it is recognized that the difluorophosphite olefin compound which is the specific additive included in the electrolyte for a secondary battery of the present invention is coordinate bonded to nickel, cobalt, and manganese which are the transition metals of the cathode of the lithium secondary battery including the lithium-nickel-cobalt-manganese-based composite oxide as the cathode active material and also forms a firm film on the surface of the cathode to stabilize the structure of the cathode, whereby characteristics of lowering battery resistance and also inhibiting change in a battery thickness at a high temperature are shown. Therefore, it is recognized that lithium secondary battery adopting the electrolyte of the present invention maintains basic performance such as a high-efficiency charge and discharge characteristic well, while showing significantly excellent high temperature characteristics.

The electrolyte for a lithium secondary battery according to the present invention includes a difluorophosphite olefin compound, whereby a thickness increase rate at a high temperature is significantly lowered, and also, a capacity retention rate and a capacity recovery rate are improved, and thus, a storage characteristic at a high temperature is excellent.

The electrolyte for a lithium secondary battery according to the present invention includes a difluorophosphite olefin compound having a structure containing both at least one difluorophosphite (—$OPF_2$) and at least one olefin in the molecule, so as to lower resistance of a battery and also to be coordinately bonded to a transition metal of a cathode more stably and firmly to further stabilize the structure of the cathode, thereby minimizing a thickness increase rate at a high temperature.

The difluorophosphite olefin compound included in the electrolyte of the present invention further stabilizes the structure of the cathode by a coordination bond with nickel, cobalt, or manganese which is the transition metal of the cathode of the lithium secondary battery including a composite metal oxide of at least one transition metal selected from the group consisting of cobalt, manganese, and nickel with lithium as a cathode active material, and also forms a coated film on the surface of the cathode, thereby significantly inhibiting change in the battery thickness at a high temperature.

That is, the difluorophosphite olefin compound is coordinately bonded to the transition metal of the cathode to form an SEI film which is a protective film having high binding force on the surface of a cathode active material layer, thereby more effectively inhibiting a reaction of the cathode with the electrolyte in the interface. Accordingly, the difluorophosphite olefin compound stabilizes the cathode structure to lower resistance of the battery and also effectively improves the problem that the battery swells due to gassing by decomposition of an electrolyte in the cathode during storage at a high temperature or continuous charge and discharge.

In addition, the olefin group in the difluorophosphite olefin compound also donates electrons to be oxidatively decomposed while being decomposed on the surface of the cathode, so that the SEI film is more stably and efficiently formed on the cathode active material to prevent direct contact between the cathode and the electrolyte, whereby significantly improved life characteristics and excellent characteristics at a high temperature may be represented.

In addition, the electrolyte for a lithium secondary battery according to the present invention further includes one or two or more additional additives selected from the group consisting of oxalatoborate-based compounds, oxalatophosphate-based compounds, fluorine-substituted carbonate-based compounds, vinylidene carbonate-based compounds, and sulfinyl group-containing compounds, with the difluorophosphite olefin compound, thereby representing better stability at a high temperature.

In addition, the lithium secondary battery of the present invention adopts the electrolyte for a lithium secondary battery of the present invention including the difluorophosphite olefin compound, thereby further stabilizing the structure of the cathode by a coordination bond with nickel, cobalt, or manganese which is the transition metals of the cathode, and also forming a firm film on the surface of the cathode to prevent a battery swelling phenomenon due to gassing during storage at a high temperature, and thus, the battery maintains basic performance such as high-efficiency charge and discharge characteristics and life characteristics well, while representing a significantly low thickness increase rate at a high temperature, and also having a high capacity retention rate and a high capacity recovery rate, thereby having excellent storage stability at a high temperature.

As described above, though the exemplary embodiments of the present invention have been described in detail, a person skilled in the art to which the present invention pertains may make various variations of the present invention without departing from the spirit and the scope of the present invention, as defined in the claims which follow. Accordingly, any modification of the following Examples of the present invention may not depart from the technique of the present invention.

What is claimed is:

1. An electrolyte for a secondary battery, the electrolyte comprising:
   a lithium salt;
   a nonaqueous organic solvent; and
   a difluorophosphite olefin compound represented by the following Chemical Formula 1:

[Chemical Formula 1]

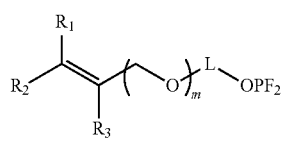

wherein
   $R_1$ to $R_3$ are independently of one another hydrogen, *—$(CH_2)_n$—$OPF_2$, C1-C10 alkyl, or C2-C10 alkenyl;

L is C1-C10 alkylene, and the alkylene of L may be further substituted by one or more selected from the group consisting of C1-C10 alkyl, *—$(CH_2)_a$—$OPF_2$, and

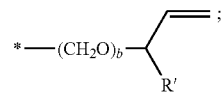

R' is hydrogen or —$OPF_2$;
   a and b are independently of each other an integer of 0 to 5;
   n is an integer of 0 to 5; and
   m is an integer of 0 to 5.

2. The electrolyte for a secondary battery of claim 1, wherein in Chemical Formula 1, $R_1$ and $R_2$ are independently of each other hydrogen, *—$(CH_2)_n$—$OPF_2$, C1-C7 alkyl, or C2-C7 alkenyl, n is an integer of 1 to 3, and $R_3$ is hydrogen or —$OPF_2$.

3. The electrolyte for a secondary battery of claim 1, wherein the difluorophosphite olefin compound is a difluorophosphite olefin compound represented by the following Chemical Formula 3 or Chemical Formula 4:

[Chemical Formula 3]

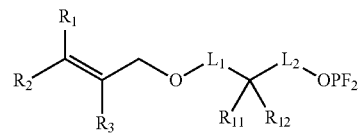

wherein
   $R_1$ to $R_3$ are as defined in Chemical Formula 1 of claim 1;
   $L_1$ is $C_1$-$C_3$ alkylene;
   $L_2$ is a single bond or C1-C3 alkylene;
   $R_{11}$ and $R_{12}$ are independently of each other hydrogen, C1-C7 alkyl, *—$(CH_2)_c$—$OPF_2$ or

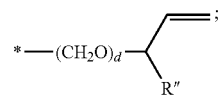

R" is hydrogen or —$OPF_2$; and
   c and d are independently of each other an integer of 1 to 3,

[Chemical Formula 4]

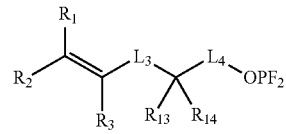

wherein
   $R_1$ to $R_3$ are as defined in Chemical Formula 1 of claim 1;
   $L_3$ and $L_4$ are independently of each other a single bond or C1-C3 alkylene;
   $R_{13}$ and $R_{14}$ are independently of each other hydrogen, C1-C7 alkyl, *—$(CH_2)_e$—$OPF_2$ or

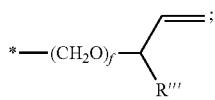

R''' is hydrogen or —OPF$_2$; and e and f are independently of each other an integer of 0 to 3.

4. The electrolyte for a secondary battery of claim 3, wherein in Chemical formula 3, R$_1$ and R$_2$ are independently of each other hydrogen or C1-C4 alkyl, and R$_3$ is hydrogen.

5. The electrolyte for a secondary battery of claim 3, wherein in Chemical Formula 4, R$_1$ and R$_2$ are independently of each other hydrogen, —(CH$_2$)$_n$—OPF$_2$, or C2-C4 alkenyl, R$_3$ is hydrogen or —OPF$_2$, and n is an integer of 1 to 3.

6. The electrolyte for a secondary battery of claim 1, wherein the difluorophosphite olefin compound is one or more selected from the following structures:

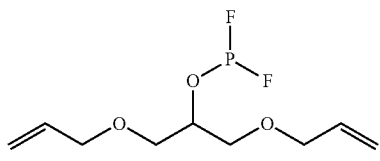

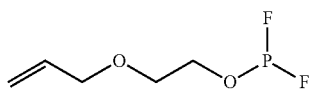

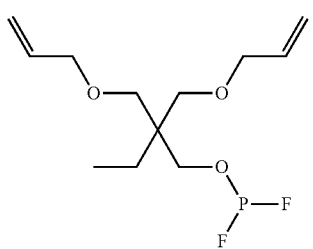

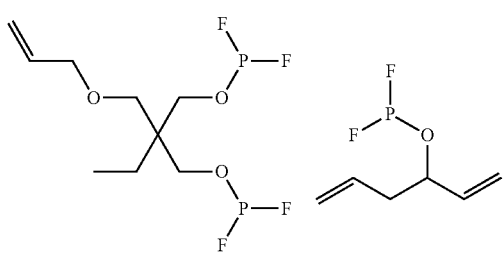

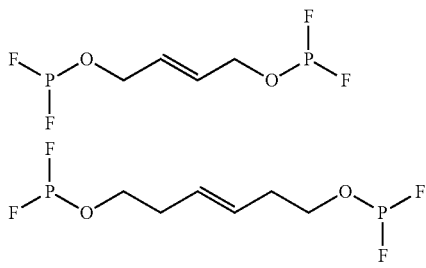

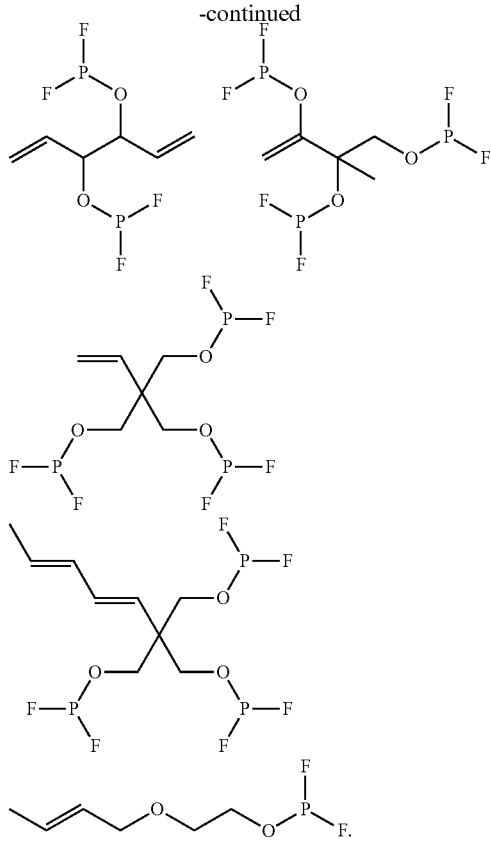

7. The electrolyte for a secondary battery of claim 1, wherein the difluorophosphite olefin compound is comprised at 0.1 to 5.0 wt %, based on a total weight of the electrolyte.

8. The electrolyte for a secondary battery of claim 1, further comprising: one or two or more additives selected from the group consisting of oxalatoborate-based compounds, oxalatophosphate-based compounds, fluorine-substituted carbonate-based compounds, vinylidene carbonate-based compounds, and sulfinyl group-containing compounds.

9. The electrolyte for a secondary battery of claim 8, wherein the sulfinyl group-containing compound is one or two or more selected from the group consisting of sulfone-based compounds, sulfite-based compounds, sulfonate-based compounds, sultone-based compounds, and sulfate-based compounds.

10. The electrolyte for a secondary battery of claim 1, further comprising: two or more additives selected from the group consisting of fluorine-substituted carbonate-based compounds, vinylidene carbonate-based compounds, sultone-based compounds, and sulfate-based compounds.

11. The electrolyte for a secondary battery of claim 1, wherein the nonaqueous organic solvent is selected from the group consisting of cyclic carbonate-based solvents, linear carbonate-based solvents, and mixed solvents thereof.

12. The electrolyte for a secondary battery of claim 11, wherein the nonaqueous organic solvent has a mixed volume ratio of a linear carbonate solvent to a cyclic carbonate solvent of 1:1 to 9:1.

13. A lithium secondary battery comprising: a cathode, an anode, and the electrolyte for a secondary battery of claim 1.

14. The lithium secondary battery of claim 13, wherein the cathode includes a composite metal oxide of at least one transition metal selected from the group consisting of cobalt, manganese, and nickel with lithium as a cathode active material.

15. The lithium secondary battery of claim 14, wherein the cathode active material is a lithium-nickel-cobalt-manganese-based composite oxide.

* * * * *

UNITED STATES PATENT AND TRADEMARK OFFICE
CERTIFICATE OF CORRECTION

PATENT NO. : 11,335,953 B2
APPLICATION NO. : 16/703917
DATED : May 17, 2022
INVENTOR(S) : Cho et al.

It is certified that error appears in the above-identified patent and that said Letters Patent is hereby corrected as shown below:

In the Claims

Column 32, Line 42, Claim 3, delete "* --$(CH_2)_c$ --$OPF_2$" and insert -- * --$(CH_2)_c$ --$OPF_2$, --

Column 32, Line 67, Claim 3, delete "* --$(CH_2)_e$ --$OPF_2$" and insert -- * --$(CH_2)_e$ --$OPF_2$, --

Column 33, Line 17, Claim 5, delete "--$(CH_2)_n$ --$OPF_2$," and insert -- * --$(CH_2)_n$ --$OPF_2$, --

Signed and Sealed this
Nineteenth Day of July, 2022

Katherine Kelly Vidal
*Director of the United States Patent and Trademark Office*